US007330880B1

(12) United States Patent
English

(10) Patent No.: US 7,330,880 B1
(45) Date of Patent: Feb. 12, 2008

(54) METHOD AND APPARATUS FOR RELIABLE DOWNLOAD TO A NETWORK CACHE WHILE LIMITING ORIGIN SERVER LOAD

(75) Inventor: Robert English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 653 days.

(21) Appl. No.: 10/131,058

(22) Filed: Apr. 22, 2002

(51) Int. Cl.
*G06F 15/16* (2006.01)
*G06F 3/00* (2006.01)

(52) U.S. Cl. ............... 709/219; 719/314; 709/203; 709/235

(58) Field of Classification Search ............... 709/203, 709/212, 214, 217, 219, 229, 235; 710/39; 711/216; 719/314
See application file for complete search history.

(56) References Cited

U.S. PATENT DOCUMENTS

| | | | |
|---|---|---|---|
| 6,205,481 B1* | 3/2001 | Heddaya et al. | 709/226 |
| 6,442,654 B1* | 8/2002 | Brock et al. | 711/141 |
| 6,810,417 B2* | 10/2004 | Lee | 709/220 |
| 6,868,453 B1* | 3/2005 | Watanabe | 709/234 |
| 2002/0156702 A1* | 10/2002 | Kane | 705/27 |
| 2002/0165727 A1* | 11/2002 | Greene et al. | 705/1 |

* cited by examiner

*Primary Examiner*—William Vaughn
*Assistant Examiner*—Peling A Shaw
(74) *Attorney, Agent, or Firm*—Blakely Sokoloff Taylor & Zafman LLP

(57) ABSTRACT

The present invention provides a method and apparatus for handling object requests to an origin server. According to one embodiment, the method comprises storing a selection of objects from an origin server in a memory storage of a caching server associated with said origin server; receiving a request for an object stored in said origin server; determining if said request is serviceable from said selection; serving said request from said selection if it is so serviceable; and if said request is not so serviceable, then determining whether a predetermined number of in-progress object retrievals associated with requests previously forwarded from said cache server to said origin server has been exceeded; forwarding said request to said origin server if said predetermined number has not been exceeded; and retrieving the object associated with said request from said origin server in response to said forwarded request.

17 Claims, 3 Drawing Sheets

METHOD AND APPARATUS FOR RELIABLE DOWNLOAD TO A NETWORK CACHE WHILE LIMITING ORIGIN SERVER LOAD

FIELD OF THE INVENTION

This invention relates to networks. In particular, it relates to the handling of requests to an origin server.

BACKGROUND

Some types of networks, for example, the Internet, make use of origin servers to service a number of requests, typically client or user requests generated by client or user devices. Each such request is a request for an object stored in an origin server. Requested objects typically include hypermedia information such as text, graphics, video, sound files, etc. As the number of requests made to an origin server at any given instant may be quite large there is a need to control the number of requests to prevent origin server overload. One approach for controlling the number of requests made to an origin server is to proxy the requests for a single object through a single connection between a cache server and the origin server. With this approach, the cache server maintains a selection of objects from the origin server and if possible attempts to serve object requests from the selection. If a requested object is not stored in the selection, then the cache server uses the single connection with the origin server to retrieve the object while queuing all subsequent requests for the object. When the object has been received, all queued requests for the requested object are then served. One disadvantage of this approach is that it is error prone since servicing the queued requests depend on the proper operation of a single connection. Further, since many requests appear to be cacheable until a response from the origin server indicates otherwise, this approach also causes non-cacheable requests for objects to queued even though there is no benefit in doing so.

An advancement over the above approach is to allow all requests that are not serviceable by the cache server to reach the origin server in parallel. This approach suffers from a drawback that it can lead to very high load at the origin server resulting in failure and service disruptions.

Accordingly, there is a need to handle requests to an origin server in a manner which prevents overload of the origin server but which is also reliable.

SUMMARY OF THE INVENTION

The invention provides a method and apparatus for handling object requests to an origin server. According to one embodiment of the invention a selection of objects from an origin server is stored in a memory storage of a cache server associated with the origin server. A request for an object stored in the origin server is received by the cache server and a determination is made as to whether the request is serviceable from the selection. Serviceable requests are served from the selection otherwise a determination is made as to whether a predetermined number of in-progress object retrievals associated with requests previously forwarded from the cache server to the origin server has been exceeded. The request is forwarded to the origin server if the predetermined number has not been exceeded and the object associated with the request is retrieved from the origin server in response to the forwarded request.

DETAILED DESCRIPTION

According to one embodiment of the invention, a client request for an object stored in an origin server is received at a cache server associated with the origin server. The cache server determines whether the object is stored locally in the cache server and serves the object to the client provided the object is not stale. If the object is stale or if the object is not stored locally in the cache server, then the cache server requests the object from the origin server provided that a predetermined number of in-progress object retrievals associated with the request previously forwarded from the cache server to the origin server has not been exceeded. If the predetermined number of in-progress object retrievals is exceeded then further requests for the object are queued in the cache server pending retrieval of the object where after the queued requests are served. The predetermined number of in-progress object retrieval is selected so as to allow a maximum number of requests to be forwarded in parallel for simultaneous processing by the origin server without overloading the origin server.

Figure 1:
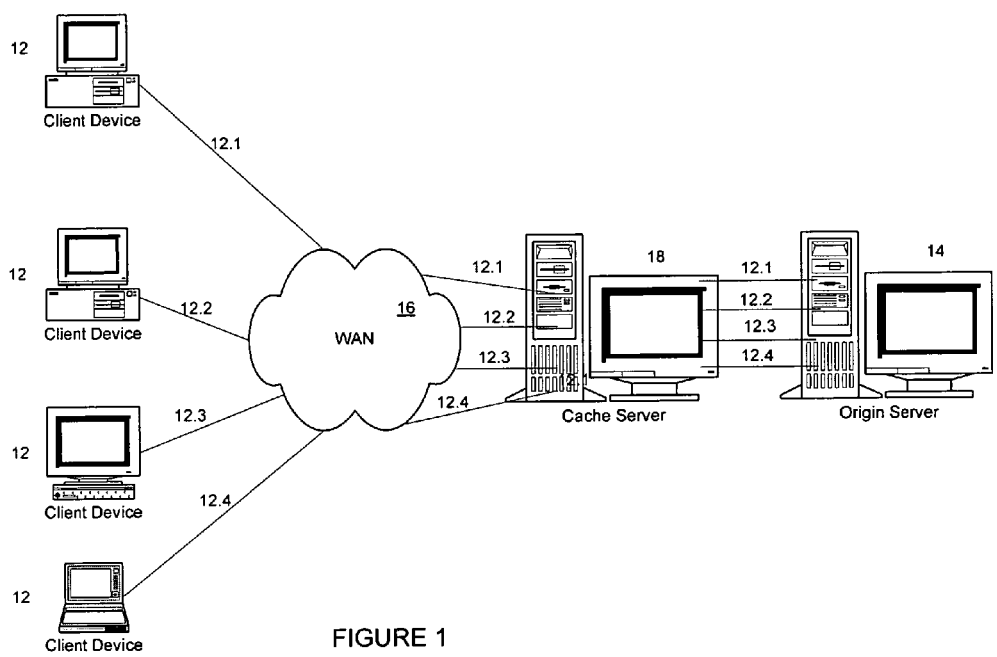
FIG. 1 shows a schematic drawing of a network environment within which embodiments of the present invention may be practiced.

Referring to FIG. 1 of the drawings, a network environment within which embodiments of the described technique may be practiced is indicated generally by reference numeral 10. Network environment 10 comprises a number of client devices 12 (only a few of which have been shown) each of which is able to communicate with an origin server 14 via a wide area network (WAN) 16 and an intermediate cache server 18 using conventional network protocols. For example, in one embodiment, the wide area network (WAN) 16 may be the Internet and the communications protocol used may be the Hypertext Transfer Protocol (HTTP). The particular wide area network or the network communications protocol being used are not critical to the present invention. As shown in FIG. 1 of the drawings, client devices 12 generate object requests 12.1 to 12.4 to origin server 14. Each object request 12.1 to 12.4 is a request for an object stored in origin server 14. Object requests 12.1 to 12.4 reach origin server 14 via WAN 16 and cache server 18. The function of the cache server is 18 to serve object requests 12.1 to 12.4, if possible and to forward said requests to origin server 14 if not possible, but only if a predetermined maximum number of previous request forwarded to said origin server is not exceeded. In essence therefore, the cache server 18 protects origin server 14 from server overload.

Figure 2:
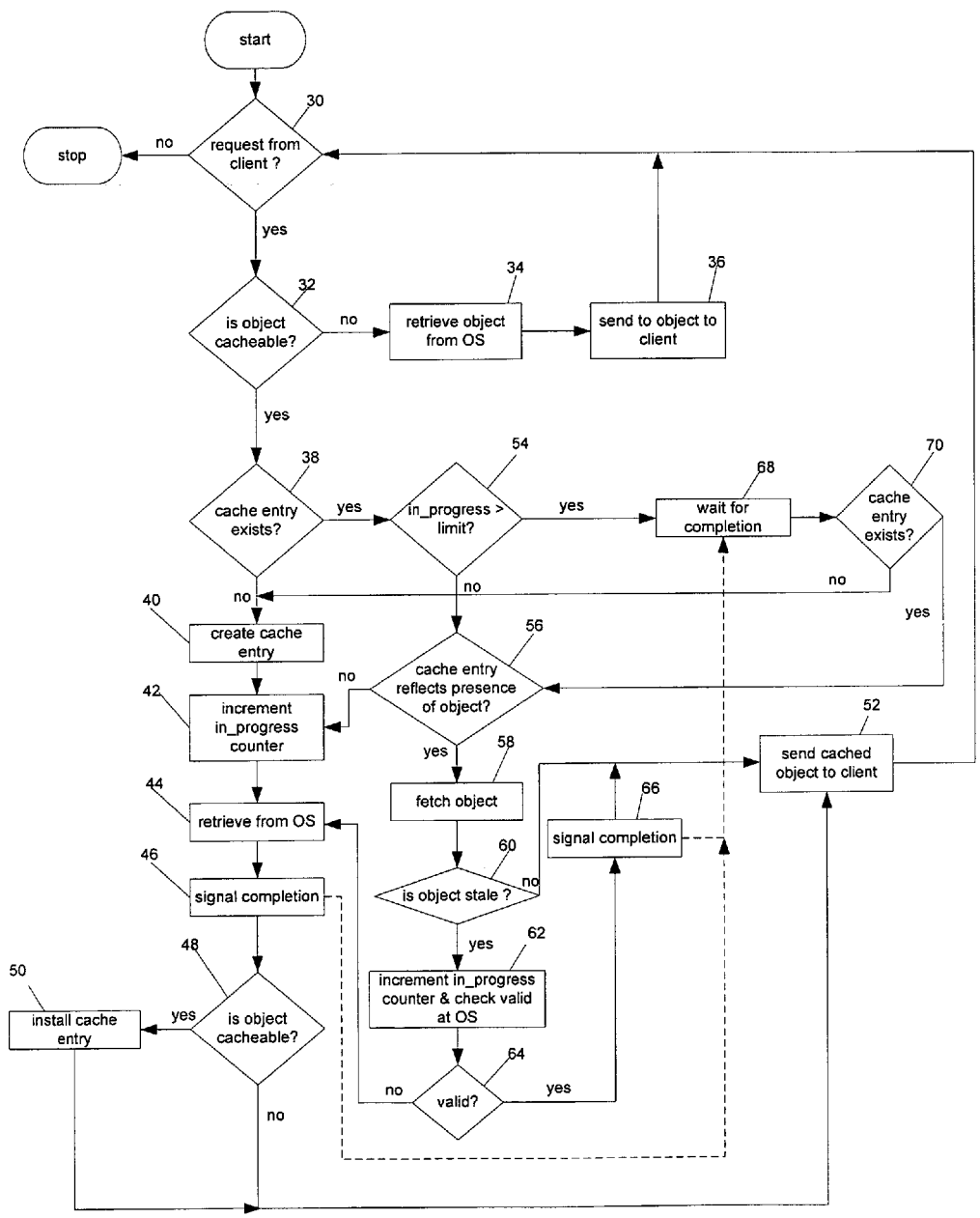
FIG. 2 shows a flow chart of operations performed by a cache server in accordance with the invention.

The particular operations performed by cache server 18 will now be described, with reference to FIG. 2 of the drawings. Referring to FIG. 2, at block 30 cache server 18 determines if a request from a client device 12 for an object stored in origin server 14 has been received. If no request has been received then the operations stop. If a request has been received then at block 32, cache server 18 determines if the request is cacheable. Whether a request is cacheable or not is determined from embedded information in the client request indicating whether the object being requested is cacheable or not. For example, if WAN 16 is the Internet and the network communications protocol being used is HTTP, then origin server 14 would provide a Uniform Resource Locator (URL) to client device 12 which identifies the object requested and contains embedded information indicating whether the object is cacheable or not. Typically, non-cacheable objects or objects having a content which changes frequently, for example, newspaper articles, stock prices, etc.

If the object being requested is not cacheable, then at block 34, the object is received from origin server 14 and sent to client device 12 at block 36. The operations are then repeated starting at block 30. If at block 32, cache server 18 determines that the client request is cacheable, then at block 38, cache server 18 determines if a cache entry exists for the object being requested. This is done by accessing a lookup table containing entries for each object stored in a memory storage associated with cache server 18. According to one embodiment, the memory storage is a dense memory storage in which objects are stored in a hash table using a hashing function. The hash values for each object are then provided in the lookup table. Thus, according to this embodiment, determining whether or a cache entry exists at block 38 includes checking the lookup table for an entry corresponding to an object stored in the memory storage. If there is no entry, then this would indicate that the object requested is not stored in the memory storage. If this is the case, then at block 40, cache server 18 creates a cache entry indicating that a request for the object has been forwarded to origin server 14 for processing. An in-progress counter is then incremented at block 42. The in-progress counter contains a count of the number of current requests which have been forwarded by cache server 18 to origin server 14 for processing. As described previously, cache server 18 controls the number of client requests which reach origin server 14 in any given instant. This is achieved, according to one embodiment, by maintaining the in-progress counter and making sure that a predetermined maximum number of in-progress requests would not be exceeded before allowing a request to reach origin server 14.

At block 44, cache server 18 retrieves the object associated with the request from origin server 14. The object is received in the form of a signal comprising individual data packets The signal completes when all data packets associated with the object have been received. At block 46, once the request completes, a signal indicated by dotted lines is sent to release threads which are waiting at block 68 (see below). At block 46, the in-progress counter is also incremented. At block 48 a determination is made as to whether the received object is cacheable. If the received object is cacheable then at block 50 a cache entry is installed corresponding to the object received and thereafter the received object is sent to client device 12 at block 52. If it is determined that the received object is not cacheable then the object is simply sent at block 52 to client device 12 without installing a corresponding cache entry. After execution of block 52 block 30 is re-executed.

If at block 38 it is determined that a cache entry exists, then block 54 is executed wherein a check is made to determine if the in-progress counter has exceeded the predetermined maximum number. As previously stated, one of the functions of cache server 18 is to protect origin server from server overload by allowing only a certain maximum number of parallel client requests to reach origin server 14. Crucial to the functioning of cache server 18 is the selection of a predetermined maximum number of requests to origin server 14 which will be allowed to reach origin server 14 in parallel. This number is usually set by a cache administrator to match the capabilities of the origin server 14 and will depend on various factors such as the number of cache servers 18 which are installed to protect origin server from server overload, the connection reliability between cache server 18 and origin server 14, the memory capacity of origin server 14, and the number of non-cacheable responses that cannot be determined by the client request. The number is selected so that the number of parallel requests is low enough that a typical origin server will not be overloaded by requests for a single object, and high enough that cache operation is not sensitive to the performance of a single request to the origin server. Origin server overload can occur when cache server 18 permits for example, over a hundred simultaneous requests to origin server 14 which has a capacity such that it cannot support over one hundred simultaneous requests. In such cases the, predetermined number is set to a value of around twenty, which is small enough to ensure that origin server 14 will not be overloaded by requests for a single object and high enough to ensure that cache operation is not sensitive to the performance of the single requests to origin server 14. The predetermined number may be configured during operation to ensure that it is low enough that a typical origin server will not be overloaded by request for a single object, and high enough that a cache operation is not sensitive to the performance of a single request to the server.

If, at block 54 it is determined that the predetermined maximum limit has not been exceeded then at block 56 it is determined whether the cache entry reflects the presence of the object in memory. This is done to ensure that the cache entry corresponds to an actual object in memory rather than merely "header" information indicating that an object is being retrieved from origin server 14. If the latter is the case, then block 42 is executed. If however, the cache entries reflects the presence of an object in memory, then block 58 is executed wherein the object is fetched from memory. At block 60, a determination is made as to whether the object is stale in that it contains old information. If the object is not stale, then it is sent to client device 12 at block 52. However, if the object is stale, which would typically be indicated by date information provided with the object, at block 62, the in-progress counter is incremented and a check is performed at origin server 14 to determine if the object is still valid in that there are no updates to the object at origin server 14. Block 64 is then executed which divides program control to two paths. The first path commences with the execution of block 42 in the case of the object being invalid. In the second path, in the case of the object being valid, block 66 is executed which is a signal completion block similar to block 46.

If it is determined at block 54, that the predetermined maximum number has been exceeded then at block 68 the request waits for completion of some other request to origin server 14 which is currently in progress. Thus, each client request is serviced by an independent thread, which processes all requests for that client device. If too many threads compete for a single object, some of the threads are blocked at 68, where they wait for those threads which are currently being serviced to complete. As has already been described, signal completion blocks 46 and 66 send signals to block 68 to unblock waiting threads. Once a thread is unblocked, block 70 executes wherein a determination is made as to whether a cache entry exists for the object being requested. If a cache entry exists then block 40 executes otherwise block 56 executes.

In one embodiment, the object requested is completely retrieved or downloaded from origin server 14 to cache server 18 before being sent to client device 12. Thus, in this embodiment the origin server-to-cache server transfer speed is not limited by the client transfer rate.

Figure 3:
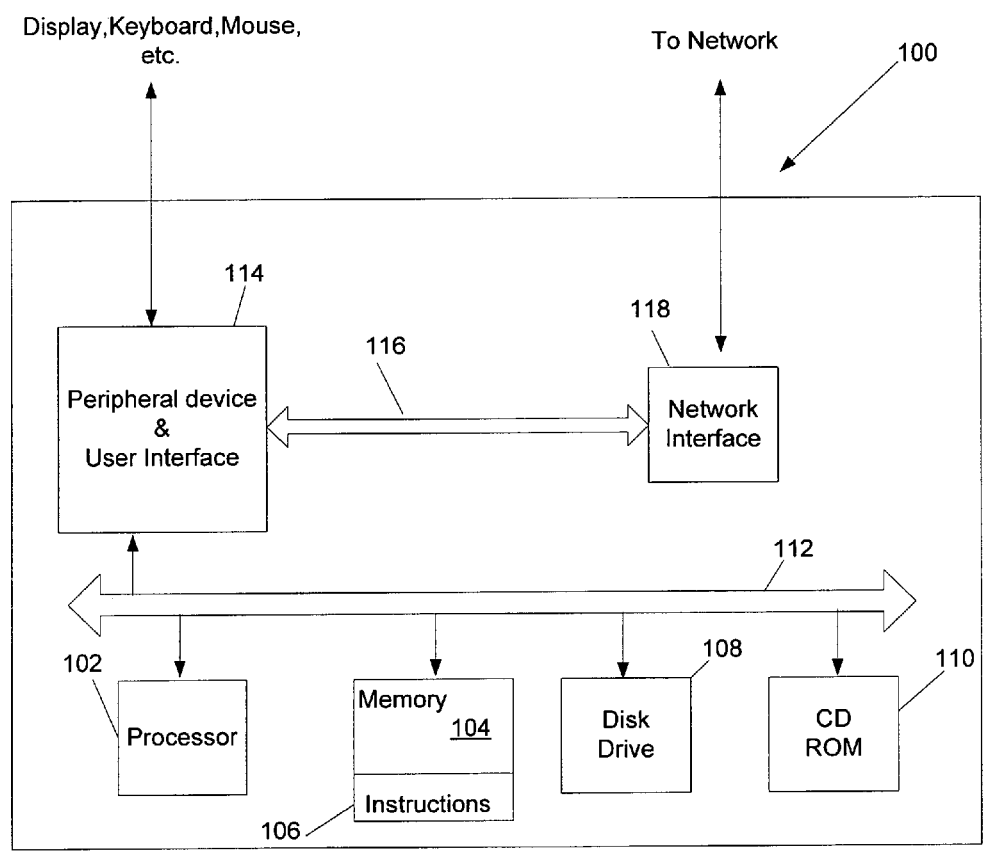
FIG. 3 shows a block diagram of a cache server in accordance with the invention.

Referring now to FIG. 3 of the drawings, reference numeral 100 generally indicates an example of hardware that may be used to implement each of cache server 18 and origin server 14. The hardware 100 includes a memory 104, which may represent one or more physical memory devices, which may include any type of random access memory (RAM), read only memory (ROM) which may be programmable, flash memory, non-volatile mass storage device, or a combination of such memory devices. The memory 104 is connected via a system bus 112 to a processor 102. The memory 104 includes instructions 106 which when executed by the processor 102 cause the processor to perform the methodology of the invention as discussed above. Additionally, the system 100 includes a disk drive 108 and a CD ROM drive 110 each of which is coupled to a peripheral-device and user-interface 114 via bus 112. Processor 102, memory 104, disk drive 108 and CD ROM 110 are generally known in the art. Peripheral-device and user-interface 114 provides an interface between system bus 112 and various components connected to a peripheral bus 116 as well as to user interface components, such as a display, mouse and other user interface devices. Processor 102 can be or include any one or more of general or special purpose programmable microprocessor, application specific integrated circuit (ASIC), programmable logic device (PLD), etc. The user interface components may be optional (for a server). A network interface 118 is coupled to peripheral bus 116 and provides network connectivity to system 100.

For the purposes of this specification, a machine-readable medium includes any mechanism that provides (i.e. stores and/or transmits) information in a form readable by a machine (e.g. computer); for example, a machine-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

It will be apparent from this description the aspects of the present invention may be embodied, at least partly, in software. In other embodiments, hardware circuitry may be used in combination with software instructions to implement the present invention. Thus, the techniques are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method of operating a network cache, the method comprising:

caching, in a storage of the network cache, objects obtained from one or more origin servers;

servicing a first object request from a client by retrieving a first requested object from said storage of the network cache;

servicing a second object request from a client by retrieving a second requested object from an origin server to the network cache while limiting, in the network cache, to a number of in-progress object requests that the network cache can send to the origin server, to a maximum number, wherein limiting the number of in-progress object requests comprises temporarily preventing object requests from being sent from the network cache to the origin server, and wherein the maximum number is selected so as to prevent the origin server from being overloaded with requests forwarded for concurrent processing and is selected based on any one or more of: a number of network caches which are installed to protect the origin server from server overload, a connection reliability between the network cache and the origin server, and a memory capacity of the origin server; and queuing object requests from clients in the network cache while object requests are being prevented from being sent from the network cache to the origin server.

2. A method as recited in claim 1, wherein limiting the number of in-progress object requests comprises preventing a request for the second requested object from being sent from the network cache to the origin server while the maximum number of in-progress object requests from the network cache to the origin server is exceeded.

3. A method as recited in claim 1, further comprising processing each queued object request, after the corresponding object has been retrieved, as if the queued request was just received at the network cache.

4. A method as recited in claim 1, further comprising sending a requested object from the network cache to a client.

5. A method of operating a network cache, the method comprising:

receiving a request at the network cache for an object from a client;

determining whether the object is cached within the network cache;

if the object is not cached within the network cache, then retrieving the object from a remote origin server only when a predetermined maximum number of in-progress object requests from the network cache to the origin server is not exceeded, wherein the predetermined maximum number is selected to avoid overloading the origin server and is based on any one or more of: a number of network caches which are installed to protect the origin server from server overload, a connection reliability between the network cache and the origin server, and a memory capacity of the origin server;

queuing object requests from clients in the network cache when the predetermined maximum number of in-progress object requests has been exceeded; and processing each queued object request in the network cache after the corresponding object has been retrieved by the network cache.

6. A method as recited in claim 5, wherein said operations further comprise sending the object to the client.

7. A method as recited in claim 5, wherein said operations further comprise maintaining a count of the in-progress object requests.

8. A method as recited in claim 5, wherein said operations further comprise determining whether the request is serviceable from a storage of the network cache by accessing a look-up table comprising entries associated with objects cached in the network cache, where the absence of an entry in the look-up table for an object indicates that a request for the object is not serviceable from said storage of the network cache.

9. A method as recited in claim 5, wherein said operations further comprise servicing the request from a storage of the network cache if the request is so serviceable, including
  retrieving the object from said storage of the network cache using information from an entry associated with the object in the look-up table;
  determining if the object is stale by checking if an expiration date associated with the object has passed; and
  updating the object if the object is stale.

10. A method as recited in claim 9, wherein said operations further comprise maintaining a count of the in-progress object requests, wherein updating the object if the object is stale comprises incrementing the count, comparing the stale object with a current object stored in the origin server; retrieving the current object if the current object is different from the stale object; and decrementing the count.

11. A network cache comprising:
  a processor;
  a storage facility to store a set of objects obtained from an origin server; and
  a memory storing instructions which, when executed by the processor, cause the network cache to perform a set of operations comprising:
    receiving a request at the network cache for an object from a client;
    determining whether the object is cached within the network cache; and
    if the object is not cached within the network cache, then retrieving the object from a remote origin server only when a predetermined maximum number of in-progress object requests from the network cache to the origin server is not exceeded, wherein the predetermined maximum number is selected so as to allow requests to be forwarded in parallel for concurrent processing by the origin server without overloading the origin server and is selected based on any one or more of: a number of network caches which are installed to protect the origin server from server overload, a connection reliability between the network cache and the origin server, and a memory capacity of the origin server;
    queuing object requests from clients in the network cache while object requests are being prevented from being sent from the network cache to the origin server; and
    sending the object to the client.

12. A network cache as recited in claim 11, wherein said set of operations further comprises maintaining a count of the in-progress object requests.

13. A network cache as recited in claim 11, wherein said set of operations further comprises determining whether the request is serviceable from said storage of the network cache by accessing a look-up table comprising entries associated with objects cached in the network cache, where the absence of an entry in the look-up table for an object indicates that a request for the object is not serviceable from said storage of the network cache.

14. A network cache as recited in claim 11, wherein said set of operations further comprises servicing the request from said storage of the network cache if the request is so serviceable, including
  retrieving the object from said storage of the network cache using information from an entry associated with the object in the look-up table;
  determining if the object is stale by checking if an expiration date associated with the object has passed; and
  updating the object if the object is stale.

15. A network cache as recited in claim 14, wherein said set of operations further comprises maintaining a count of the in-progress object requests, wherein updating the object if the object is stale comprises incrementing the count, comparing the stale object with a current object stored in the origin server; retrieving the current object if the current object is different from the stale object; and decrementing the count.

16. A network cache as recited in claim 11, wherein said set of operations further comprises queuing object requests from clients in the network cache when the predetermined number of in-progress object requests has been exceeded.

17. A network cache as recited in claim 16, wherein said set of operations further comprises processing each queued object request, after the corresponding object has been retrieved, as if the queued request was just received at the network cache.

* * * * *